(12) United States Patent
Wang et al.

(10) Patent No.: US 7,821,720 B2
(45) Date of Patent: Oct. 26, 2010

(54) ENDOSCOPE OBJECTIVE LENS WITH LARGE ENTRANCE PUPIL DIAMETER AND HIGH NUMERICAL APERTURE

(75) Inventors: Xinghua Wang, Clifton Park, NY (US); Siavash Yazdanfar, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 191 days.

(21) Appl. No.: 12/125,512

(22) Filed: May 22, 2008

(65) Prior Publication Data

US 2009/0290236 A1   Nov. 26, 2009

(51) Int. Cl.
*G02B 21/02* (2006.01)
*A61B 1/00* (2006.01)

(52) U.S. Cl. .................. 359/656; 359/659; 359/660; 600/101

(58) Field of Classification Search .......... 359/656–661
See application file for complete search history.

(56) References Cited

U.S. PATENT DOCUMENTS

| | | | |
|---|---|---|---|
| 4,037,938 A | 7/1977 | Yamashita et al. | |
| 4,042,295 A | 8/1977 | Yamasita et al. | |
| 4,059,344 A | 11/1977 | Yamasita | |
| 4,493,537 A | 1/1985 | Nakahashi | |
| 4,846,154 A * | 7/1989 | MacAnally et al. | 600/171 |
| 5,198,931 A * | 3/1993 | Igarashi | 359/660 |
| 6,236,521 B1 | 5/2001 | Nanba | |
| 6,618,205 B2 | 9/2003 | Murayama | |
| 7,027,231 B2 | 4/2006 | Miyano | |
| 7,180,686 B2 | 2/2007 | Kato | |
| 2008/0228037 A1 * | 9/2008 | Cline et al. | 600/160 |

* cited by examiner

*Primary Examiner*—Jordan M. Schwartz
(74) *Attorney, Agent, or Firm*—Jenifer E. Haeckl

(57) ABSTRACT

An endoscope objective lens for collecting combined bright field (white light) and fluorescence images includes a negative lens group, a stop, and a positive lens group. The lens has a combination of large entrance pupil diameter ($\geq 0.4$ mm) for efficiently collecting weak fluorescence light, large ratio between the entrance pupil diameter and the maximum outside diameter ($D_{entrance}/D_{max}$ larger than 0.2), large field of view (FFOV$\geq 120°$) and favorably corrected spherical, lateral chromatic and Petzval field curvature for both visible and near infrared wavelengths.

14 Claims, 7 Drawing Sheets

ENDOSCOPE OBJECTIVE LENS WITH LARGE ENTRANCE PUPIL DIAMETER AND HIGH NUMERICAL APERTURE

BACKGROUND

This invention relates generally to lens systems, and more particularly to an endoscope objective lens suitable for collecting white light and fluorescence images, where the numerical aperture and entrance pupil diameter is large to allow higher collection power for weak fluorescence signal, while maintaining a small overall diameter.

Conventionally, endoscopes are utilized for places that are difficult to see directly, especially inside human bodies. As its objective lens system, various kinds constituted of multiple lens elements are known.

While conventional retrofocus lens systems for endoscopy cover a large field of view, this type of arrangement usually has a small entrance pupil diameter in order to minimize third order aberrations at large field and thus maintain high optical performance. Although this is normally adequate for bright field imaging, it is not optimized for fluorescence, where the typical fluorescence signal strength is substantially weaker than the white light image. The small entrance pupil means that the collection efficiency of the objective is very weak. It is advantageous for an objective intended for dual modality imaging to have improved collection power, maintain a small overall diameter, large FFOV, easy of manufacturing and high optical resolution for both visible and near infrared wavelength.

SUMMARY OF THE INVENTION

Briefly, an endoscope objective lens comprises a negative lens group, $G_1$; a positive lens group, $G_2$; and a stop, S, placed between the negative lens group, $G_1$, and the positive lens group, $G_2$, wherein the following conditions (1) to (4) are satisfied:

$$0.5 \leq EFL \leq 1.4 \text{ mm}, -4 \leq F1/EFL \leq -1.2, 1.1 \leq F2/EFL \leq 1.9 \quad (1)$$

$$F\# \leq 4.2, \quad (2)$$

$$EPD \geq 0.4 \text{ mm}, 0.4 \geq EPD/Dia \geq 0.2 \quad (3)$$

$$FFOV \geq 120° \quad (4)$$

and wherein,

EFL is the effective focal length of the objective lens,
F1 is the effective focal length of the positive lens group, $G_1$,
F2 is the effective focal length of the negative lens group, $G_2$,
F# is the f number of the objective lens,
EPD is the entrance pupil diameter of the objective lens,
Dia is the maximum diameter of the objective lens, and
FFOV is the full field of view of the objective lens.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
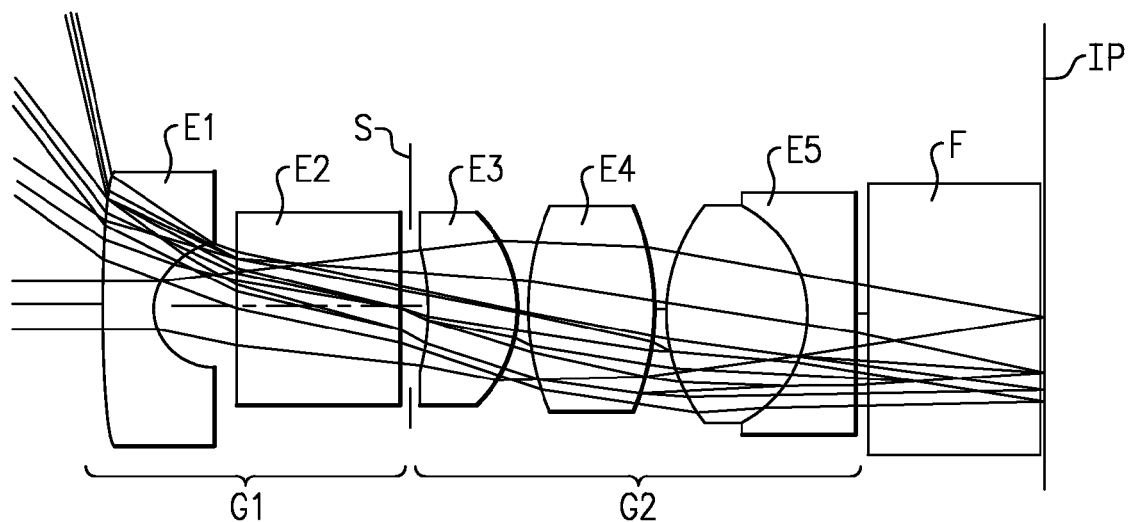
FIG. 1 is a schematic drawing showing the constitution of an endoscope objective lens according to Example 1 of the invention.

Referring to the drawings wherein identical reference numerals denote the same elements throughout the various views, FIGS. 1-5 illustrate an endoscope objective lens according to exemplary embodiments of the invention. In the figures, incoming rays enter the objective lens system from the left and are ultimately incident on a detector at the far right of the diagrams. Several embodiments are disclosed with detailed design parameters.

In general, the endoscope objective lens of the invention comprises a negative lens group, $G_1$, a positive lens group, $G_2$, and a stop, S, placed between the negative lens group, $G_1$, and the positive lens group, $G_2$. The endoscope objective lens of the invention satisfies the following Conditional Expressions:

$$0.5 \leq EFL \leq 1.4 \text{ mm}, -4 \leq F1/EFL \leq -1.2, 1.1 \leq F2/EFL \leq 1.9 \quad (1)$$

$$F\# \leq 4.2, \quad (2)$$

$$EPD \geq 0.4 \text{ mm}, 0.4 \geq EPD/Dia \geq 0.2 \quad (3)$$

$$FFOV \geq 120° \quad (4)$$

wherein,

EFL is the effective focal length of the objective lens,
F1 is the effective focal length of the positive lens group, $G_1$,
F2 is the effective focal length of the negative lens group, $G_2$,
F# is the f number of the objective lens,
EPD is the entrance pupil diameter of the objective lens,
Dia is the maximum diameter of the objective lens, and
FFOV is the full field of view of the objective lens.

In the event that fluorescence imaging is performed in the near infrared, the wavelength range objective lens needs to extend beyond the visible spectrum. It is preferable for the objective to be able to cover a spectrum of between about 400 nm-850 nm, and more preferably between about 400 nm-1970 nm, as shown in Example 4.

In order to achieve high resolution imaging, the optical resolution of the system needs to match the pixel size of the detector, or ~3.6 μm assuming a ⅙" detector. At 850 nm, the F# required for the objective to produce a 3.6 μm rms spot diameter is preferably F#≦4.2, and more preferably ≦2.8 to produce sharp images, especially for near infrared light.

For endoscopy applications, the angular field coverage is preferred to be as large as possible to allow the maximum observation of the lumen. The FFOV is greater than or equal to 120°, and preferably FFOV≧170°.

The dual modality use of the objective requires the objective to have a means to fully reject the excitation light to avoid overwhelming the weak fluorescence signal. This requires at least one (preferably two) optical filter disposed between the last lens element of the objective and the detector. Such an optical filter, typically an interference type laser rejection filter, is made on glass with finite thickness, usually greater than or equal to 0.7 mm.

Due to the large angle of rays transmitted through the filter, the passband of the laser rejection filter may shift up to 2% of the central bandwidth. This requires the optical filter to have a passband full width at half maximum (FWHM) in the range of 10-50 nm.

In an alternative embodiment, a second laser optical filter, such as a laser rejection filter, and the like, is tilted by ≧10° in order to prevent any multiple reflection between the two filters.

The optical filter, F, may comprises a laser rejection filter, such as a volume holographic filter, a thin film dielectric filter, dichroic filter, a polarization interference filter, an air spaced or solid spaced etalon.

In an alternative embodiment, in addition to the optical filter, F, a tunable filter, such as a liquid crystal etalon or a liquid crystal tunable polarization interference filter, can be used adjunct with a monochromatic CCD for multi-spectral imaging or hyperspectral imaging endoscope such that the center wavelength of the tunable filter matches relevant excitation wavelengths. This tunable filter allows for the possible identification and distinction of multiple fluorescence dye stained tissues. For example, the center wavelength of the tunable filter can be in the range between about 600-800 nm.

Spherical surfaces are preferred in the embodiment for manufacturing considerations. However, this does not exclude usage of aspherical surfaces or plastic inject molded elements in the design.

EXAMPLES

Below, the endoscope objective lens of the invention is further explained employing concrete examples.

Example 1

The schematic constitution of an endoscope objective lens of Example 1 is shown in FIG. 1. In this endoscope objective lens, the negative lens group, $G_1$, arranged proximate the object side comprises a negative lens element $E_1$ directing its concave surface to the image side, and a flat element (zero power element) $E_2$. The positive lens group, $G_2$, arranged distal the object side comprises a positive lens element $E_3$ directing its convex surface to the image side, a positive lens element $E_4$, and a doublet lens element, $E_5$. A stop, S, is placed between the negative lens group, $G_1$, and the positive lens group, $G_2$, and an optical filter, F, is placed between the last lens element $E_5$ of the positive lens group, $G_2$, and the image plane, IP. In one embodiment, the optical filter, F, comprises a laser rejection filter. The doublet lens element, $E_5$, comprises two elements having a refractive index greater than 0.02 and an Abbe number difference greater than 15.0 for correcting chromatic, coma, and spherical aberration in visible and near infrared wavelengths.

Radius of curvature R (mm) of each lens surface, thickness or air gap (mm) between lenses, glass code, and semi-aperture are listed in Table I. Note that numbers in the table indicate the order from the object side. Also, as shown in Table I, the Conditions Expressions (1) to (4) are all satisfied.

TABLE I

| Surface # | Radius (mm) | Thickness (mm) | Glass | Semi-Aperture |
|---|---|---|---|---|
| 1 | inf | 15.000 | | |
| 2 | 23.24000 | 0.420 | 562712.6376 | 1.05 |
| 3 | 0.80385 | 0.703 | | 0.62 |
| 4 | inf | 1.440 | 755201.2758 | 0.65 |
| Stop | inf | 0.100 | | 0.65 |
| 5 | −4.83861 | 0.807 | 620410.6032 | 0.75 |
| 6 | −1.81488 | 0.100 | | 0.75 |
| 7 | 4.91982 | 1.098 | 559702.6397 | 0.9 |
| 8 | −3.63847 | 0.098 | | 0.9 |
| 9 | 2.61880 | 1.200 | 620410.6032 | 1 |
| 10 | −1.94907 | 0.433 | 755201.2758 | 1 |
| 11 | inf | 0.100 | | 1 |
| 12 | inf | 1.500 | 458500.678 | 1.1 |
| 13 | inf | 0.090 | | 1.1 |
| Image | inf | −0.003 | | 1.15 |

EFL = 0.96, EPD = 0.5, F1 = −1.485, F2 = 1.776, FNO = 1.92, FFOV = 170 deg, F1/EFL = −1.546, F2/EFL = 1.85, EPD/Dia = 0.227, EFL/IH = 1.09

Example 2

Figure 2:
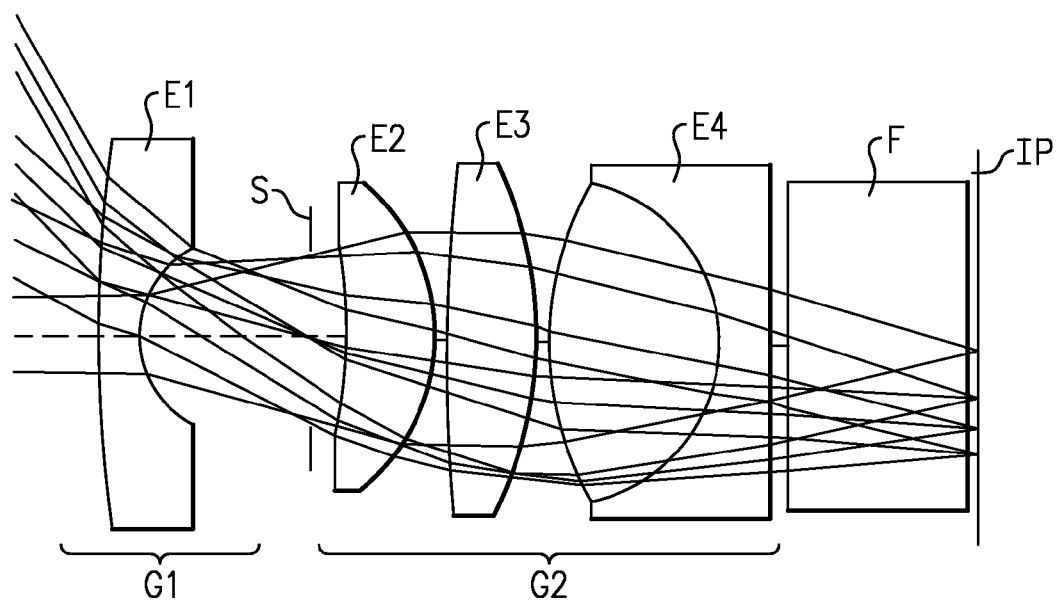
FIG. 2 is a schematic drawing showing the constitution of an endoscope objective lens according to Example 2 of the invention.

The schematic constitution of an endoscope objective lens of Example 2 is shown in FIG. 2. In this endoscope objective lens, the negative lens group, $G_1$, arranged proximate the object side comprises a negative lens element $E_1$ directing its concave surface to the image side. The positive lens group, $G_2$, arranged distal the object side comprises a positive lens element $E_2$ directing its convex surface to the image side, a positive lens element $E_3$, and a doublet lens element, $E_4$. A stop, S, is placed between the negative lens group, $G_1$, and the positive lens group, $G_2$, and an optical filter, F, is placed between the last lens element $E_5$ of the positive lens group, $G_2$, and the image plane, IP. In one embodiment, the optical filter, F, comprises a laser rejection filter. The doublet lens element, $E_4$, comprises two elements having a refractive index greater than 0.02 and an Abbe number difference greater than 15.0 for correcting chromatic, coma, and spherical aberration in visible and near infrared wavelengths Radius of curvature R (mm) of each lens surface, thickness or air gap (mm) between lenses, glass code, and semi-aperture are listed in TABLE II. Note that numbers in the table indicate the order from the object side. Also, as shown in TABLE II, the Conditions Expressions (1) to (4) are all satisfied.

TABLE II

| Surface # | Radius (mm) | Thickness (mm) | Glass | Semi-Aperture |
|---|---|---|---|---|
| 1 | inf | 15.077 | | |
| 2 | 12.30000 | 0.323 | 530894.6618 | 1.25 |
| 3 | 0.82280 | 1.396 | | 0.62 |

TABLE II-continued

| Surface # | Radius (mm) | Thickness (mm) | Glass | Semi-Aperture |
|---|---|---|---|---|
| Stop | inf | 0.300 | | 0.65 |
| 4 | −3.61427 | 0.734 | 620410.6032 | 0.65 |
| 5 | −1.68472 | 0.100 | | 0.75 |
| 6 | 16.54421 | 0.733 | 542767.6522 | 0.75 |
| 7 | −3.37801 | 0.100 | | 0.9 |
| 8 | 2.74422 | 1.403 | 729373.4604 | 0.9 |
| 9 | −1.35000 | 0.450 | 755201.2758 | 1 |
| 10 | −42.46217 | 0.098 | | 1 |
| 11 | inf | 1.500 | 458500.678 | 1 |
| 12 | inf | 0.138 | | 1.1 |
| Image | inf | | | 1.15 |

EFL = 0.96, EPD = 0.7, F1 = −1.685, F2 = 1.60, FNO = 1.37, FFOV = 170 deg, F1/EFL = −1.755, F2/EFL = 1.667, EPD/Dia = 0.28

Example 3

Figure 3:
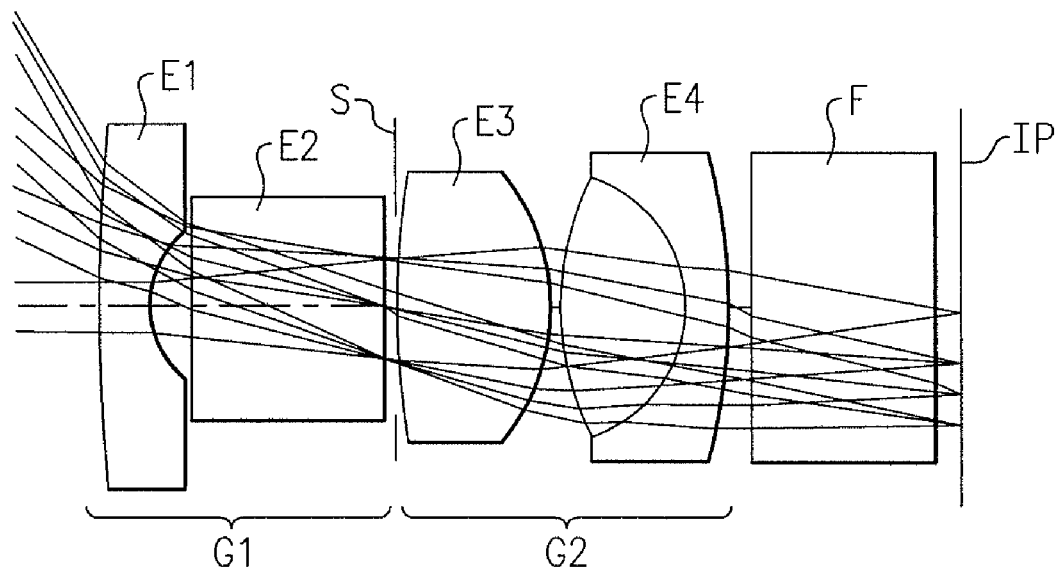
FIG. 3 is a schematic drawing showing the constitution of an endoscope objective lens according to Example 3 of the invention.

The schematic constitution of an endoscope objective lens of Example 3 is shown in FIG. 3. In this endoscope objective lens, the negative lens group, $G_1$, arranged proximate the object side comprises a negative lens element $E_1$ directing its concave surface to the image side, and a flat element (zero power element) $E_2$. The positive lens group, $G_2$, arranged distal the object side comprises a positive lens element $E_3$ directing its convex surface to the image side, and a doublet lens element $E_4$. A stop, S, is placed between the negative lens group, $G_1$, and the positive lens group, $G_2$, and an optical filter, F, is placed between the last lens element $E_5$ of the positive lens group, $G_2$, and the image plane, IP. In one embodiment, the optical filter, F, comprises a laser rejection filter.

Radius of curvature R (mm) of each lens surface, thickness or air gap (mm) between lenses, glass code, and semi-aperture are listed in TABLE III. Note that numbers in the table indicate the order from the object side. Also, as shown in TABLE III, the Conditions Expressions (1) to (4) are all satisfied.

TABLE III

| Surface # | Radius (mm) | Thickness (mm) | Glass | Semi-Aperture |
|---|---|---|---|---|
| 1 | inf | 15.000 | | |
| 2 | 16.68332 | 0.423 | 527304.6649 | 1.10 |
| 3 | 0.82300 | 0.326 | | 1.10 |
| 4 | inf | 1.600 | 487490.7041 | 0.68 |
| Stop | inf | 0.100 | | 0.42 |
| 5 | 8.94786 | 1.277 | 743972.4485 | 0.51 |
| 6 | −1.85896 | 0.098 | | 0.87 |
| 7 | 2.55373 | 1.031 | 620410.6032 | 0.98 |
| 8 | −1.19591 | 0.355 | 755201.2758 | 0.97 |
| 9 | −5.15044 | 0.200 | | 1.10 |
| 10 | inf | 1.500 | 458500.678 | 1.10 |
| 11 | inf | 0.200 | | 1.10 |
| Image | inf | | | 1.15 |

EFL = 1.00, EPD = 0.45, F1 = −1.66, F2 = 1.488, FNO = 2.22, FFOV = 120 deg, F1/EFL = −1.66, F2/EFL = 1.488, EPD/Dia = 0.20, Example 4

Figure 4:
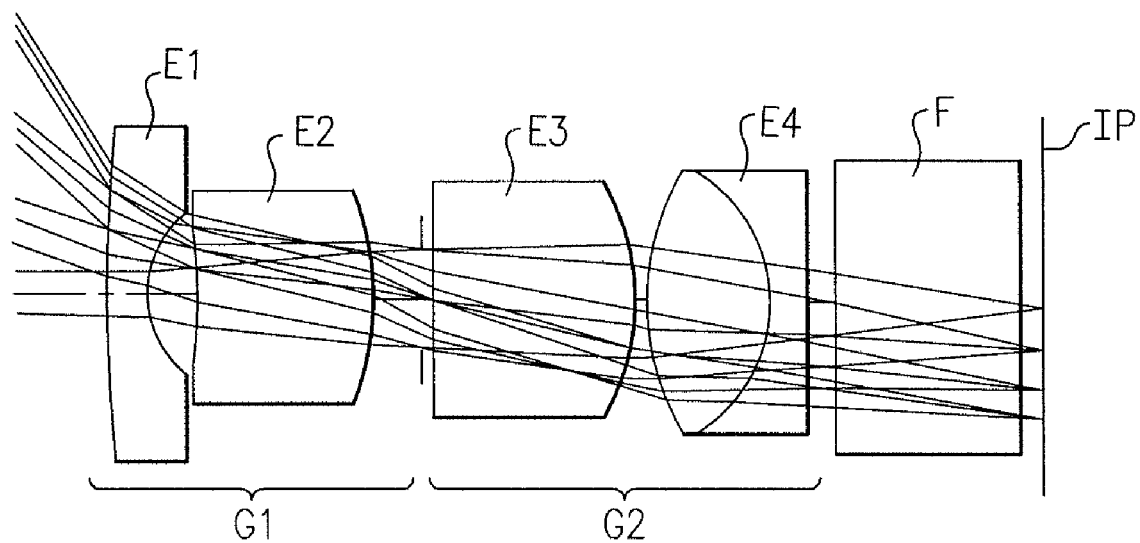
FIG. 4 is a schematic drawing showing the constitution of an endoscope objective lens according to Example 4 of the invention.

The schematic constitution of an endoscope objective lens of Example 4 is shown in FIG. 4. In this endoscope objective lens, the negative lens group, $G_1$, arranged proximate the object side comprises a negative lens element $E_1$ directing its concave surface to the image side, and a flat element (zero power element) $E_2$. The positive lens group, $G_2$, arranged distal the object side comprises a positive lens element $E_3$ directing its convex surface to the image side, and a doublet lens element $E_4$. A stop, S, is placed between the negative lens group, $G_1$, and the positive lens group, $G_2$, and an optical filter, F, is placed between the last lens element $E_5$ of the positive lens group, $G_2$, and the image plane, IP. In one embodiment, the optical filter, F, comprises a laser rejection filter. The doublet lens element, $E_4$, comprises two elements having a refractive index greater than 0.02 and an Abbe number difference greater than 15.0 for correcting chromatic, coma, and spherical aberration in visible and near infrared wavelengths Radius of curvature R (mm) of each lens surface, thickness or air gap (mm) between lenses, glass code, and semi-aperture are listed in TABLE IV. Note that numbers in the table indicate the order from the object side. Also, as shown in TABLE IV, the Conditions Expressions (1) to (4) are all satisfied.

TABLE IV

| Surface # | Radius (mm) | Thickness (mm) | Glass | Semi-Aperture |
|---|---|---|---|---|
| 1 | inf | 15.000 | | |
| 2 | 12.20000 | 0.323 | 620437.6032 | 1.10 |
| 3 | 0.82300 | 0.386 | | 1.10 |
| 4 | −79.82783 | 1.400 | 487490.7041 | 0.68 |
| 5 | −2.17607 | 0.255 | | 0.42 |
| Stop | inf | 0.100 | | 0.51 |
| 6 | −11.29718 | 1.191 | 743930.4485 | 0.87 |
| 7 | −1.92178 | 0.098 | | 0.98 |
| 8 | 2.35491 | 0.984 | 620393.6032 | 0.97 |
| 9 | −1.28650 | 0.320 | 755201.2758 | 1.10 |
| 10 | −8.35965 | 0.200 | | 1.10 |
| 11 | inf | 1.500 | 458500.678 | 1.10 |
| 12 | inf | 0.200 | | 1.15 |
| Image | inf | | | |

EFL = 1.00, EPD = 0.4, F1 = −3.88, F2 = 1.80, FNO = 2.5, FFOV = 120 deg, F1/EFL = −3.88, F2/EFL = 1.80, EPD/Dia = 0.227, wavelength: 400-1970 nm Example 5

Figure 5:
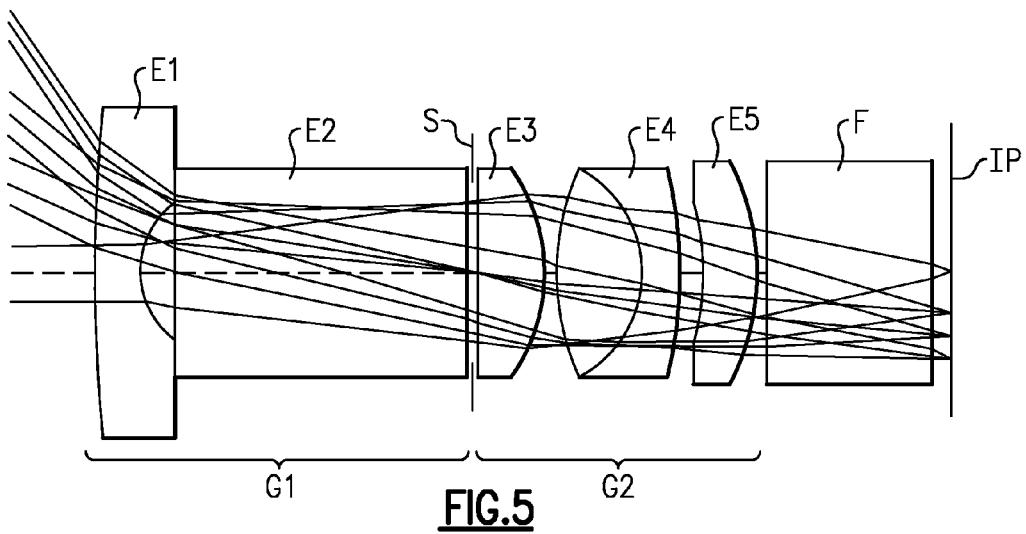
FIG. 5 is a schematic drawing showing the constitution of an endoscope objective lens according to Example 5 of the invention.

The schematic constitution of an endoscope objective lens of Example 5 is shown in FIG. 5. In this endoscope objective lens, the negative lens group, $G_1$, arranged proximate the object side comprises a negative lens element $E_1$ directing its concave surface to the image side, and a flat element (zero power element) $E_2$. The positive lens group, $G_2$, arranged distal the object side comprises a positive lens element $E_3$ directing its convex surface to the image side, a doublet lens element $E_4$, and a positive lens element $E_5$ directing its convex surface to the image side. A stop, S, is placed between the negative lens group, $G_1$, and the positive lens group, $G_2$, and an optical filter, F, is placed between the last lens element $E_5$ of the positive lens group, $G_2$, and the image plane, IP. In one embodiment, the optical filter, F, comprises a laser rejection filter. The doublet lens element, $E_4$, comprises two elements having a refractive index greater than 0.02 and an Abbe number difference greater than 15.0 for correcting chromatic, coma, and spherical aberration in visible and near infrared wavelengths Radius of curvature R (mm) of each lens surface, thickness or air gap (mm) between lenses, glass code, and semi-aperture are listed in TABLE V. Note that numbers in the table indicate the order from the object side. Also, as shown in TABLE V, the Conditions Expressions (1) to (4) are all satisfied.

TABLE V

| Surface # | Radius (mm) | Thickness (mm) | Glass | Semi-Aperture |
|---|---|---|---|---|
| 1 | inf | 15.000 | | |
| 2 | 16.68332 | 0.423 | 596016.6165 | 1.10 |
| 3 | 0.82300 | 0.326 | | 0.72 |
| 4 | inf | 2.654 | 755201.2758 | 0.75 |
| Stop | inf | 0.100 | | 0.66 |
| 5 | −115.15093 | 0.626 | 729902.4599 | 0.66 |
| 6 | −1.78112 | 0.098 | | 0.73 |
| 7 | 2.56745 | 0.789 | 620410.6032 | 0.72 |
| 8 | −1.09207 | 0.340 | 755201.2758 | 0.67 |
| 9 | −4.20543 | 0.200 | | 0.68 |
| 10 | −3.61952 | 0.500 | 487544.704 | 0.70 |
| 11 | −2.43219 | 0.098 | | 0.76 |
| 12 | inf | 1.500 | 458500.678 | 0.78 |
| Image | inf | | | 0.75 |

EFL = 0.900, EPD = 0.45, F1 = −1.47, F2 = 1.56, FNO = 1.63, FFOV = 140 deg, F1/EFL = −1.63, F2/EFL = 1.73, EPD/Dia = 0.25

Example 6

Figure 6:
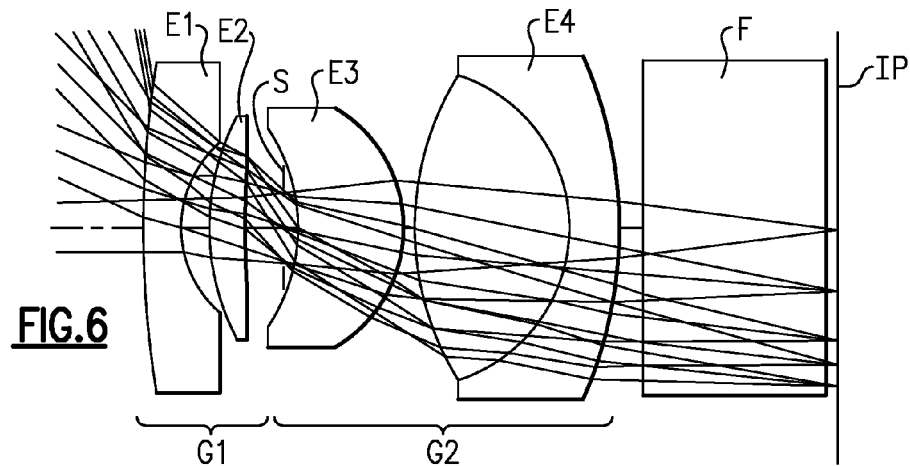
FIG. 6 is a schematic drawing showing the constitution of an endoscope objective lens according to Example 6 of the invention.

The schematic constitution of an endoscope objective lens of Example 6 is shown in FIG. 6. In this endoscope objective lens, the negative lens group, $G_1$, arranged proximate the object side comprises a negative lens element $E_1$ directing its concave surface to the image side, and a positive lens element $E_2$ directing its convex surface to the object side. The positive lens group, $G_2$, arranged distal the object side comprises a positive lens element $E_3$ directing its convex surface to the image side, and a doublet lens element $E_4$. A stop, S, is placed between the negative lens group, $G_1$, and the positive lens group, $G_2$, and a laser rejection filter, F, is placed between the last lens element $E_5$ of the positive lens group, $G_2$, and the image plane, IP. The doublet lens element, $E_4$, comprises two elements having a refractive index greater than 0.02 and an Abbe number difference greater than 15.0 for correcting chromatic, coma, and spherical aberration in visible and near infrared wavelengths Radius of curvature R (mm) of each lens surface, thickness or air gap (mm) between lenses, glass code, and semi-aperture are listed in TABLE VI. Note that numbers in the table indicate the order from the object side. Also, as shown in TABLE VI, the Conditions Expressions (1) to (4) are all satisfied.

TABLE VI

| Surface # | Radius (mm) | Thickness (mm) | Glass | Semi-Aperture |
|---|---|---|---|---|
| 1 | inf | 15.000 | | |
| 2 | 9.80000 | 0.323 | 743798.4486 | 1.10 |
| 3 | 0.99000 | 0.226 | | 0.72 |
| 4 | 1.95491 | 0.300 | 755201.2758 | 0.69 |
| 5 | 18.84610 | 0.330 | | 0.59 |
| Stop | inf | 0.100 | | 0.29 |
| 6 | −1.74834 | 0.878 | 743972.4485 | 0.36 |
| 7 | −1.18107 | 0.100 | | 0.75 |
| 8 | 2.60415 | 1.283 | 640639.5661 | 1.07 |
| 9 | −1.33195 | 0.400 | 755201.2758 | 1.14 |
| 10 | −3.56468 | 0.200 | | 1.10 |
| 11 | inf | 1.500 | 458500.678 | 1.11 |
| 12 | inf | 0.110 | | 1.1 |
| Image | inf | | | 1.1 |

EFL = 1.28, EPD = 0.45, F1 = −3.66, F2 = 1.45, FNO = 2.88, FFOV = 170 deg, F1/EFL = −2.85, F2/EFL = 1.13, EPD/Dia = 0.205

Figure 7:
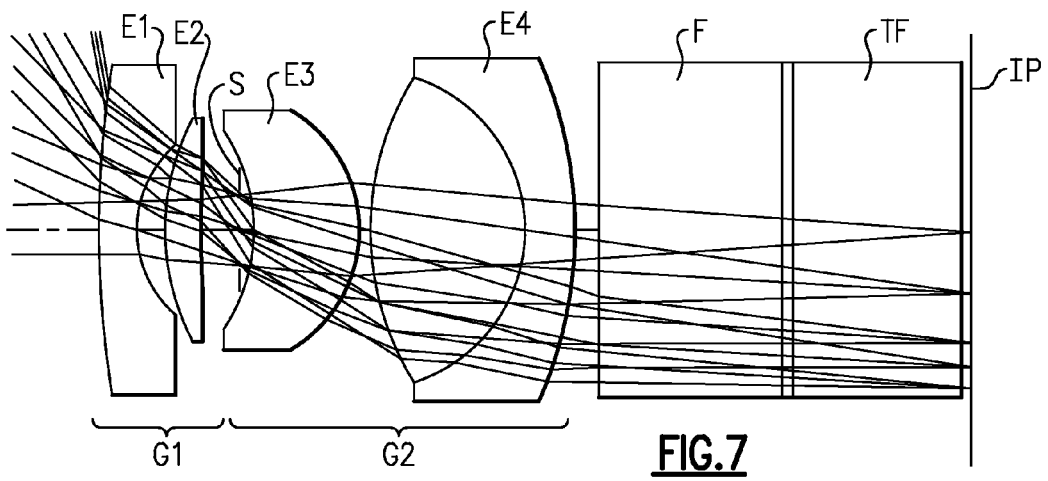
FIG. 7 is a schematic drawing showing the constitution of an endoscope objective lens with both an optical filter and a tunable filter according to an alternate embodiment of the invention.
Figure 8A:
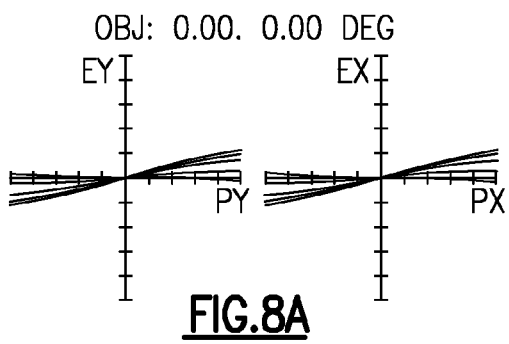
FIGS. 8A-8D and FIGS. 9A and 9B are aberration charts showing various aberrations (spherical aberration, astigmatism, coma, and distortion) of the endoscope objective lens of Example 4.
Figure 8B:
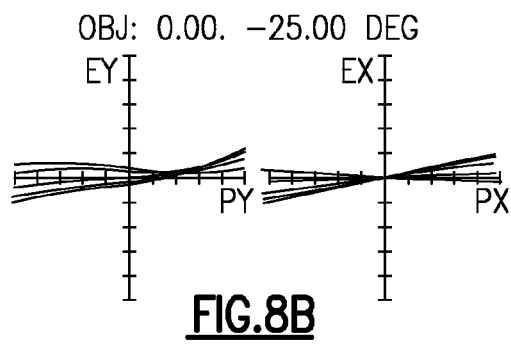
Figure 8C:
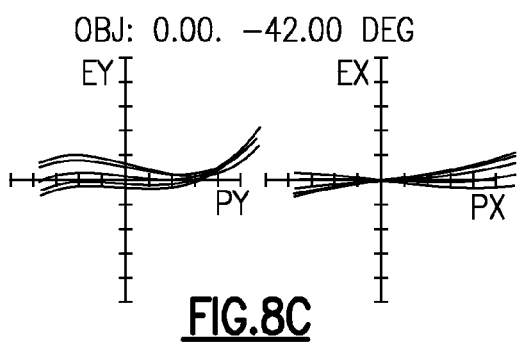
Figure 8D:
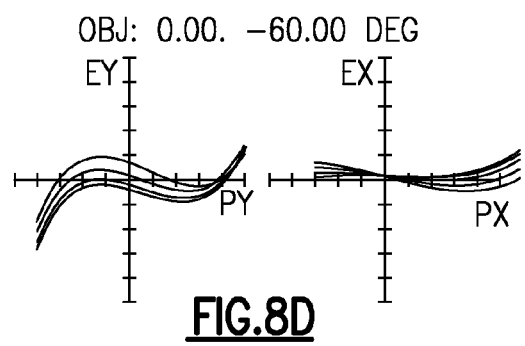
Figure 9A:
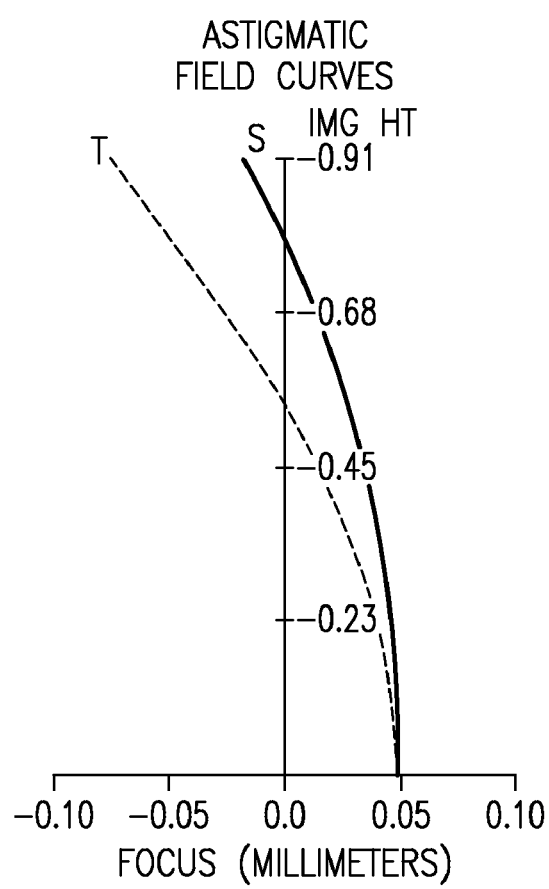
Figure 9B:
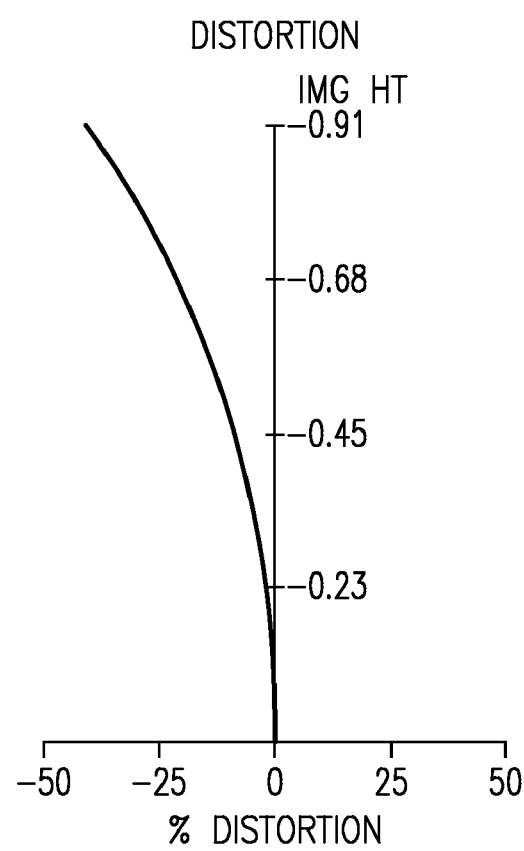
Figure 10A:
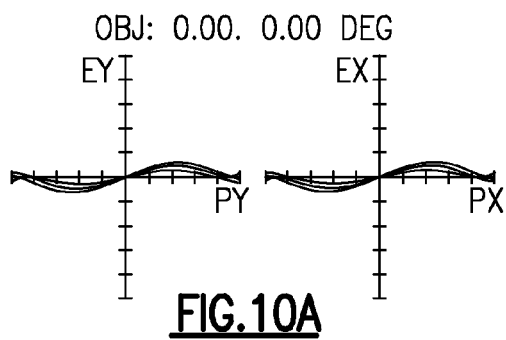
FIGS. 10A-10D and FIGS. 11A and 11B are aberration charts showing various aberrations (spherical aberration, astigmatism, coma, and distortion) of the endoscope objective lens of Example 5.
Figure 10B:
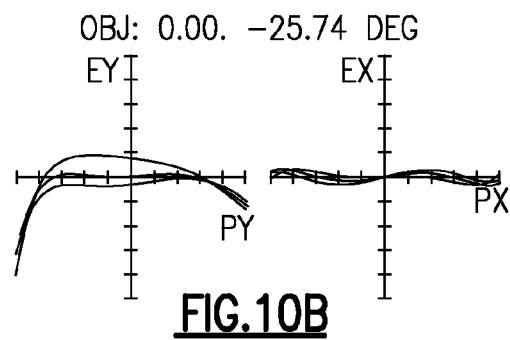
Figure 10C:
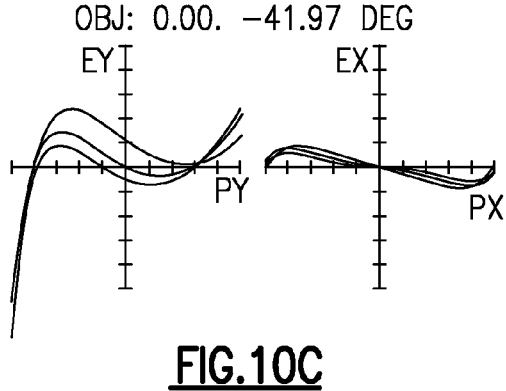
Figure 10D:
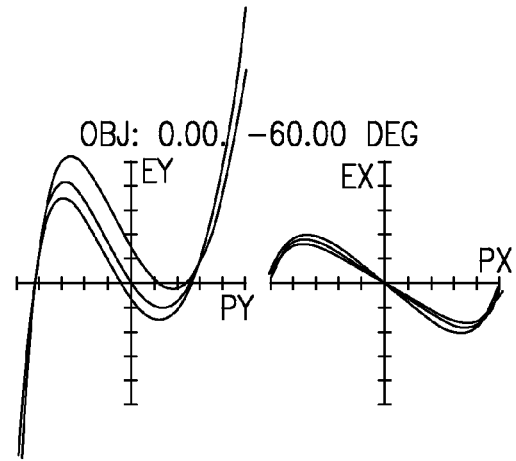
Figure 11A:
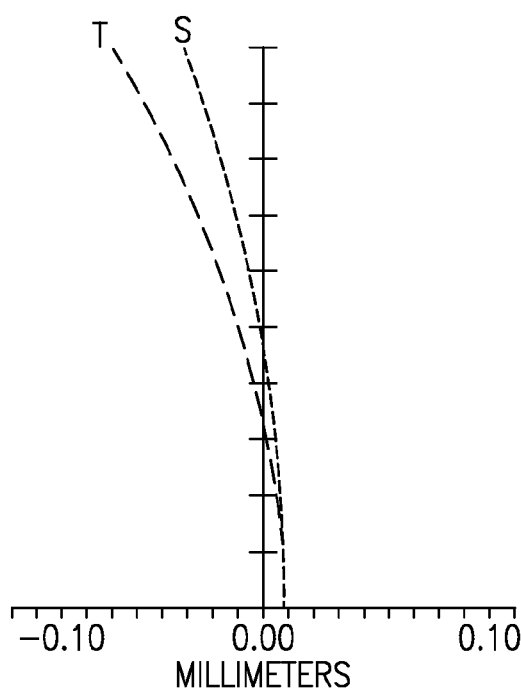
Figure 11B:
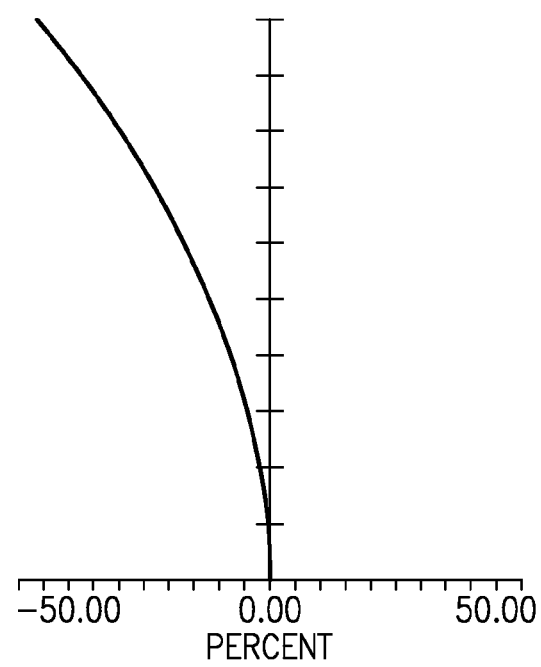

According to an alternate embodiment, the endoscope objective lens 10 may include a tunable filter, TF, as shown in FIG. 7. In this embodiment, the tunable filter, TF, such as a liquid crystal etalon or a liquid crystal tunable polarization interference filter, can be used adjunct with a monochromatic CCD for multi-spectral imaging or hyperspectral imaging endoscope such that the center wavelength of the tunable filter matches relevant excitation wavelengths. This tunable filter allows for the possible identification and distinction of multiple fluorescence dye stained tissues. For example, the center wavelength of the tunable filter, TF, can be in the range between about 600-800 nm.

FIGS. 8A-8D and FIGS. 9A-9B are aberration charts showing spherical aberration, astigmatism, coma, and distortion of the endoscope objective lens of Example 4. Note that shown in the astigmatism chart are aberrations for the saggital image surface and the tangential image surface. In these aberration charts, ω indicates half angle of view. As is clear from these aberration charts, aberrations can be corrected extremely well with the endoscope objective lens of Example 4.

FIGS. 10A-10D and FIGS. 11A-12B are aberration charts showing spherical aberration, astigmatism, coma, and distortion of the endoscope objective lens of Example 5. Note that shown in the astigmatism chart are aberrations for the saggital image surface and the tangential image surface. As is clear from these aberration charts, aberrations can be corrected extremely well with the endoscope objective lens of Example 5.

The endoscope objective lens of the invention has about four (4) times higher collection power as compared with the prior art because the collection power is proportional to the square of the EPD. The ratio between the EPD and the outer dimension of the largest element is a good indicator of the effectiveness of using the maximum allowable diameter for collecting light. This ratio is generally small (<0.15), as compared to $\geq 0.2$ in the invention.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An endoscope objective lens, comprising:
   a negative lens group, $G_1$;
   a positive lens group, $G_2$;
   a stop, S, placed between the negative lens group, $G_1$, and the positive lens group, $G_2$;
   an optical filter, F, placed between the positive lens group, $G_2$, and an image plane, IP; and
   a tunable filter, TF, for performing multi-spectral imaging or hyperspectral imaging,
   wherein all of the following conditions (1) to (4) are satisfied:

$0.5 \leq EFL \leq 1.4$ mm, and $-4 \leq F1/EFL \leq -1.2$, and
   $1.1 \leq F2/EFL \leq 1.9$ \hfill (1)

$F\# \leq 4.2$ \hfill (2)

$EPD \geq 0.4$ mm, and $0.4 \geq EPD/Dia \geq 0.2$ \hfill (3)

$FFOV \geq 120°$ \hfill (4)

and wherein,
   EFL is the effective focal length of the objective lens,
   F1 is the effective focal length of the negative lens group, $G_1$, F2 is the effective focal length of the positive lens group, $G_2$, F# is the f number of the objective lens, EPD is the entrance pupil diameter of the objective lens, Dia is the maximum diameter of the objective lens, and FFOV is the full field of view of the objective lens.

2. The endoscope objective lens according to claim 1, wherein the optical filter comprises a laser rejection filter selected from the group consisting of a volume holographic filter, a thin film dielectric filter, a dichroic filter, a polarization interference filter, an air spaced or a solid spaced etalon.

3. The endoscope objective lens according to claim 1, wherein the tunable filter, TF, comprises one of a liquid crystal etalon and a liquid crystal tunable polarization interference filter.

4. The endoscope objective lens according to claim 2, wherein the laser rejection filter has a center wavelength in a range between about 600-800 nm.

5. The endoscope objective lens according to claim 1, wherein the negative lens group, $G_1$, comprises a negative meniscus lens with a concave surface directed toward an image side.

6. The endoscope objective lens according to claim 1, wherein the negative lens group, $G_1$, comprises a negative meniscus lens with a concave surface directed toward an image side, and a zero power element.

7. The endoscope objective lens according to claim 1, wherein the negative lens group, $G_1$, comprises a negative meniscus lens element with a concave surface directed toward an image side, and a positive lens element with a convex surface directed toward an object side.

8. The endoscope objective lens according to claim 1, wherein the positive lens group, $G_2$, comprises a first positive lens element with a convex surface directed toward an image side, and a doublet lens element.

9. The endoscope objective lens according to claim 8, wherein the doublet lens element comprises two elements having a refractive index greater than 0.02 and an Abbe number difference greater than 15.0 for correcting chromatic, coma, and spherical aberration in visible and near infrared wavelengths.

10. The endoscope objective lens according to claim 1, wherein the positive lens group, $G_2$, comprises a first positive lens element with a convex surface directed toward an image side, a doublet lens element, and a second positive lens element between the first positive lens element and the doublet lens element.

11. The endoscope objective lens according to claim 10, wherein the doublet lens element comprises two elements having a refractive index greater than 0.02 and an Abbe number difference greater than 15.0 for correcting chromatic, coma, and spherical aberration in visible and near infrared wavelengths.

12. The endoscope objective lens according to claim 1, wherein the positive lens group, $G_2$, comprises a first positive lens element with a convex surface directed toward an image side, a second positive lens element, and a doublet lens element between the first positive lens element and the second positive lens element.

13. The endoscope objective lens according to claim 12, wherein the doublet lens element comprises two elements having a refractive index greater than 0.02 and an Abbe number difference greater than 15.0 for correcting chromatic, coma, and spherical aberration in visible and near infrared wavelengths.

14. An endoscope system having fluorescence/white light dual imaging modality comprising an endoscope objective lens according to claim 1.

* * * * *